US012719192B2

(12) United States Patent
Choi

(10) Patent No.: US 12,719,192 B2
(45) Date of Patent: Aug. 25, 2026

(54) CABLE CONNECTOR

(71) Applicant: LS ELECTRIC CO., LTD., Anyang-si (KR)

(72) Inventor: Won Suk Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 328 days.

(21) Appl. No.: 18/576,430

(22) PCT Filed: Sep. 13, 2022

(86) PCT No.: PCT/KR2022/013586
§ 371 (c)(1),
(2) Date: Jan. 4, 2024

(87) PCT Pub. No.: WO2023/043141
PCT Pub. Date: Mar. 23, 2023

(65) Prior Publication Data
US 2024/0322468 A1 Sep. 26, 2024

(51) Int. Cl.
*H01R 12/75* (2011.01)
*H01R 13/502* (2006.01)
*H01R 13/52* (2006.01)

(52) U.S. Cl.
CPC ........... *H01R 12/75* (2013.01); *H01R 13/502* (2013.01); *H01R 13/5205* (2013.01)

(58) Field of Classification Search
CPC ... H01R 12/75; H01R 13/502; H01R 13/5205
(Continued)

(56) References Cited

U.S. PATENT DOCUMENTS 7,270,562 B1 * 9/2007 Trout ................. H01R 13/6215 439/364
8,545,264 B2 * 10/2013 Nawa ................... H01R 13/562 439/587
(Continued)

FOREIGN PATENT DOCUMENTS

DE 102020208659 A1 1/2021
JP 2013016320 A 1/2013
(Continued)

OTHER PUBLICATIONS

International Search Report for related International Application No. PCT/KR2022/013586; action dated Mar. 23, 2023; (3 pages).
(Continued)

*Primary Examiner* — Gary F Paumen
(74) *Attorney, Agent, or Firm* — K&L Gates LLP

(57) ABSTRACT

A cable connector is provided. The cable connector according to an aspect of the present disclosure is a cable connector for connecting a lug, which is formed at one end of a cable and includes a protrusion with a greater diameter than the cable, to a circuit board provided within a case, the cable connector comprising: a first member fixed to the case and having a through-hole into which the cable can be inserted; and a second member provided at one side of the first member and having a coupling hole to which the protrusion of the lug can be coupled, wherein the second member includes a first lug fixing portion formed at the inlet side of the coupling hole, adjacent to the first member, to protrude inward into the coupling hole.

10 Claims, 9 Drawing Sheets

1 : 10, 20, 30
10 : 12, 13, 14, 15, 17, 19
20 : 22, 23, 24, 27
30 : 32, 33, 36

(58) Field of Classification Search
USPC .................................................. 439/364, 589
See application file for complete search history.

(56) References Cited

U.S. PATENT DOCUMENTS

| | | | |
|---|---|---|---|
| 2001/0019922 A1 | 9/2001 | Fuehrer et al. |
| 2016/0104956 A1 | 4/2016 | Santos et al. |
| 2017/0194744 A1 | 7/2017 | Guetig et al. |
| 2018/0034175 A1 | 2/2018 | Lloyd et al. |

FOREIGN PATENT DOCUMENTS

| | | |
|---|---|---|
| KR | 20130084929 A | 7/2013 |
| KR | 20160091131 A | 8/2016 |
| KR | 20210020652 A | 2/2021 |

OTHER PUBLICATIONS

Written Opinion for related International Application No. PCT/KR2022/013586; action dated Mar. 23, 2023; (4 pages).
Office Action for related Korean Application No. 10-2021-0124229; action dated Jun. 24, 2023; (4 pages).
Extended European Search Report for related European Application No. 22870225.4; action dated Aug. 26, 2025; (6 pages).

* cited by examiner

1 : 10, 20, 30
10 : 12, 14, 17, 19
20 : 26

1 : 10, 20, 30
10 : 12, 13, 14, 15, 17, 19
20 : 22, 23, 24, 27
30 : 32, 33, 36

CABLE CONNECTOR

CROSS-REFERENCE TO RELATED APPLICATION

This application is a National Stage of International Application No. PCT/KR2022/013586, filed on Sep. 13, 2022, which claims priority to and the benefit of Korean Patent Application No. 10-2021-0124229, filed on Sep. 16, 2021, the disclosures of which is incorporated herein by reference in its entirety.

FIELD

The present disclosure relates to a cable connector.

BACKGROUND

Various cables are connected to circuit boards installed in electronic devices. Among them, current cables are connected to direct current (DC) reactors to transmit a current to the circuit boards. Generally, a lug provided with a hole to which a screw can be coupled is provided on one end of a current cable.

Conventionally, an insulation cap which is formed of an insulator and into which an end portion of the lug is fitted is used to connect a circuit board and a current cable.

Conventionally, the cable is coupled to one side of the insulation cap by fitting the end portion of the lug into a hole of the insulation cap, one surface of the circuit board in which a hole corresponding to the hole of the insulation cap is formed is disposed on the other side of the insulation cap, and a screw passes through the hole of the circuit board and is coupled to the lug to connect the circuit board and the current cable.

However, since the conventional insulation cap is not fixed, the lug can move, it is difficult to couple the screw to the lug, and thus there is a problem in connecting the cable to an exact position of the circuit board.

In addition, since the conventional insulation cap does not have a structure capable of supporting a force for coupling the lug and the screw, stress can be applied to the circuit board and the cable, and the circuit board and the cable can be deformed or damaged by the stress.

Accordingly, the development of a cable connector capable of supporting a force applied to a lug and stably fixing a current cable is required.

In addition, the development of a cable connector capable of fixing positions of a cable and a lug to stably connect the cable at an exact position of a circuit board is required.

SUMMARY

The present disclosure is intended to address the above-described problems and directed to providing a cable connector capable of supporting a force applied to a cable.

The present disclosure is also directed to providing a cable connector capable of stably fixing a cable in an electronic device.

The present disclosure is also directed to providing a cable connector capable of stably connecting a cable at an exact position of a circuit board in an electronic device.

The present disclosure is also directed to providing a cable connector capable of being applied to various cables regardless of levels of dustproofness and waterproofness required according to a cable.

Objectives of the present disclosure are not limited the above-described objectives, and objectives which are not described above will be clearly understood by those skilled in the art from the following descriptions.

One aspect of the present disclosure provides a cable connector which connects a lug formed on one end of a cable and including a protruding portion having a diameter greater than a diameter of the cable to a circuit board installed in a case, the cable connector including a first member which is fixed to the case and in which a through-hole into which the cable is inserted is formed and a second member which is installed on one side of the first member and in which a coupling port to which the protruding portion of the lug is coupled is formed, wherein the second member includes a first lug fixing part formed to protrude in an inward direction of the coupling port on an entrance of the coupling port adjacent to the first member.

The cable connector may further include a third member installed on one side of the second member, wherein a coupling hole to which an end portion of the lug is coupled may be formed in the third member, and a second lug fixing part protruding in an inward direction of the coupling hole may be formed in the coupling hole.

A shape of a cross section of the coupling port may correspond to a shape of a cross section of the protruding portion of the lug.

The through-hole, the coupling port, and the coupling hole may be coaxially arranged.

A fixing groove may be formed in an outer circumferential surface of the first member, and a fixing protrusion insertion-coupled to the fixing groove may be formed on the case.

A reinforcement part protruding in an outward direction of the cable may be formed on an outer circumferential surface of the first member.

The first member may be formed of an elastic material, and the second member may be formed of a rigid plastic material.

A cable guide communicating with the through-hole may be formed in the first member to guide the cable into the through-hole, and a sealing part formed to prevent dust or moisture from penetrating an inside of the through-hole may be provided on the cable guide.

The cable may be provided as a plurality of cables, the through-hole, the coupling port, and the coupling hole may be provided as a plurality of through-holes, a plurality of coupling ports, and a plurality of coupling holes to individually correspond to the plurality of cables, a guide protrusion formed to protrude to a predetermined height in a longitudinal direction of the cable may be formed between the plurality of coupling ports, and a guide groove to which the guide protrusion is coupled may be formed in the third member.

In a cable connector according to an embodiment of the present disclosure, since a first member in which a cable is accommodated is fixed to a case, a force applied to a lug can be supported, and the cable can be stably fixed in an electronic device.

In addition, in a cable connector according to an embodiment of the present disclosure, since a first lug fixing part protruding in an inward direction of a coupling port is formed on an entrance of the coupling port, on which a lug formed on one end of a cable is seated, to support a lower side of the lug, a cable can be stably connected at an exact position of a circuit board.

In addition, in a cable connector according to an embodiment of the present disclosure, since a sealing part which prevents dust or moisture from penetrating the inside of a first member is provided on a cable guide for guiding a cable into the first member, the cable connector capable of being applied to various cables regardless of levels of dustproofness and waterproofness required according to a cable can be provided.

Effects of the present disclosure are not limited to the above-described effects, and effects which are not described above will be clearly understood by those skilled in the art from the following specification and the accompanying drawings.

DETAILED DESCRIPTION

Figure 1:
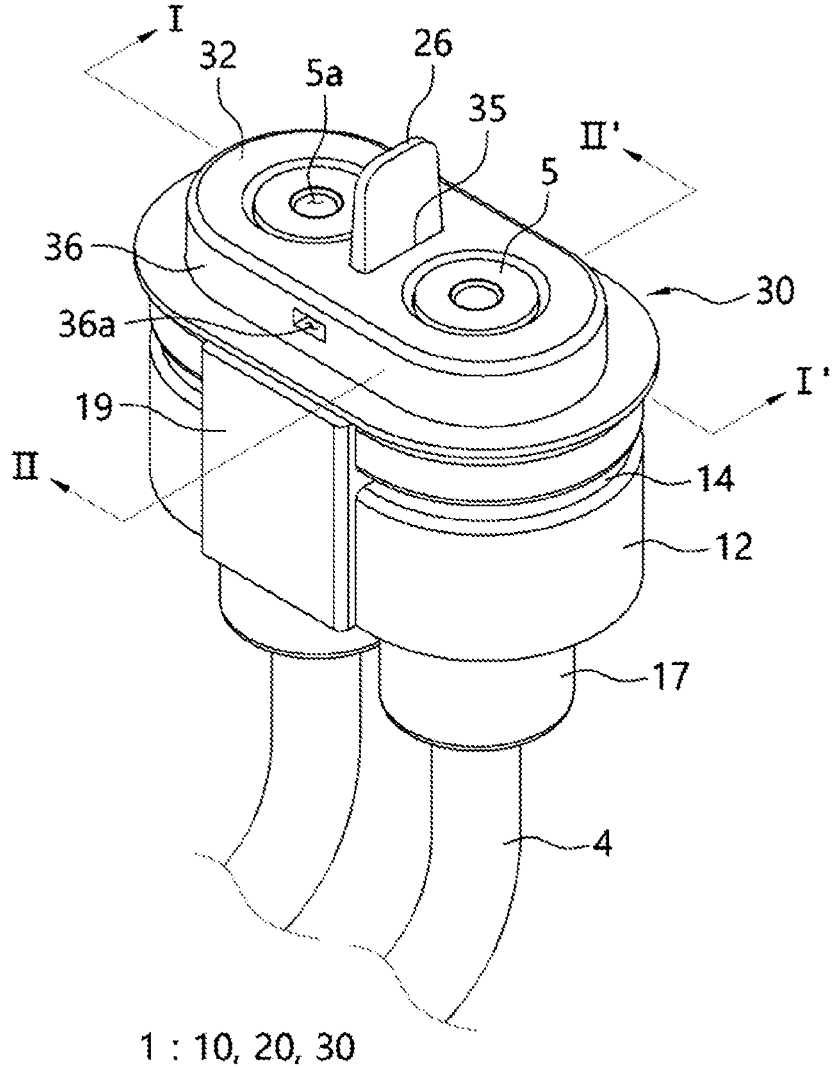
FIG. 1 is a perspective view illustrating a state in which a cable is coupled to a cable connector according to one embodiment of the present disclosure.

Hereinafter, various embodiments of the present disclosure will be described in detail with reference to the accompanying drawings in order for those skilled in the art to easily perform the present disclosure. The present disclosure may be implemented in several different forms and is not limited to the embodiments described herein. Parts irrelevant to description are omitted in the drawings in order to clearly describe the present disclosure, and the same or similar parts are denoted by the same reference numerals throughout this specification. In addition, sizes and shapes of components illustrated in the drawings may be exaggeratedly illustrated for clear and convenient description.

It should be understood that the terms "comprise," "comprising," "include," and/or "including" used in the present specification specify the presence of stated features, numbers, steps, operations, elements, and/or components but do not preclude the presence or addition of one or more other features, numbers, steps, operations, elements, components, and/or groups thereof.

In addition, in the present specification, spatially relative terms such as "front," "rear," "upper," "lower," "upper," and the like may be used to describe relationships between components illustrated in the drawings. These terms are relative terms defined based on components illustrated in the drawings, and position relations thereof may be oppositely interpreted according to directions thereof.

Unless there are special circumstances, a case in which a first component is disposed "in front of," "behind," "above," or "under" a second component includes not only a case in which the first component is disposed directly "in front of," "behind," "above," or "under" the second component, but also a case in which a third component is interposed therebetween.

Since a cable connector according to one embodiment of the present disclosure can support a force applied to a circuit board and a cable when the circuit board and the cable are connected, deformation of the circuit board and the cable can be prevented, and the cable can be stably connected at an exact position of the circuit board.

In the present specification, a case may be a housing for accommodating internal components of an electronic device or a frame installed in an electronic device for supporting internal components.

In the present specification, the cable may be a current cable through which a current flows to supply a current to the circuit board. However, the cable connector according to one embodiment of the present disclosure is not limited to the current cable and may be applied to various types of cables connected to a circuit board in an electronic device.

Figure 2:
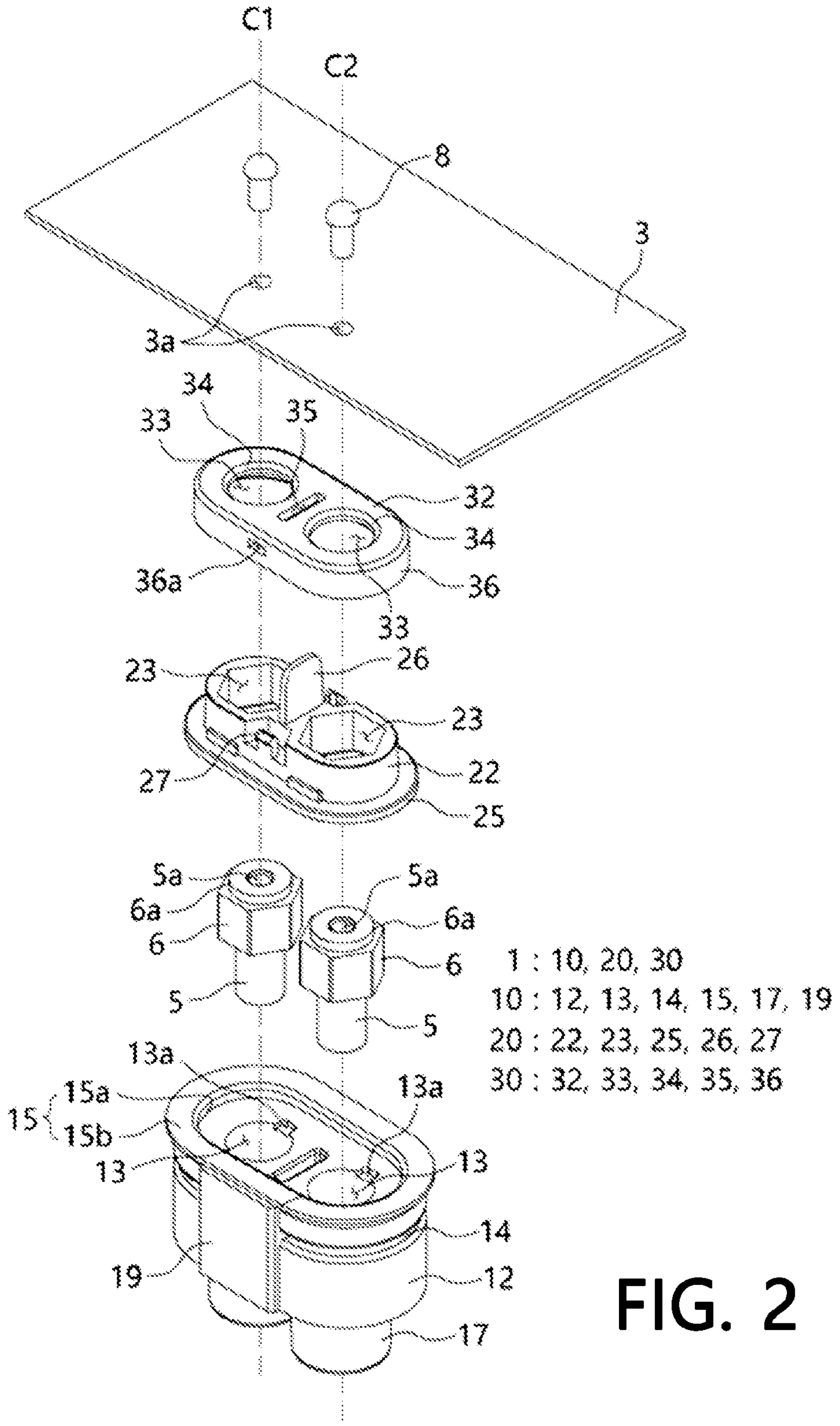
FIGS. 2 and 3 are exploded perspective views illustrating a state in which the cable connector, a lug, a circuit board, and a coupling screw according to one embodiment of the present disclosure are dissembled from different angles. In this case, in order to describe the present disclosure, the circuit board and the coupling screw are not illustrated in FIG. 3.
Figure 3:
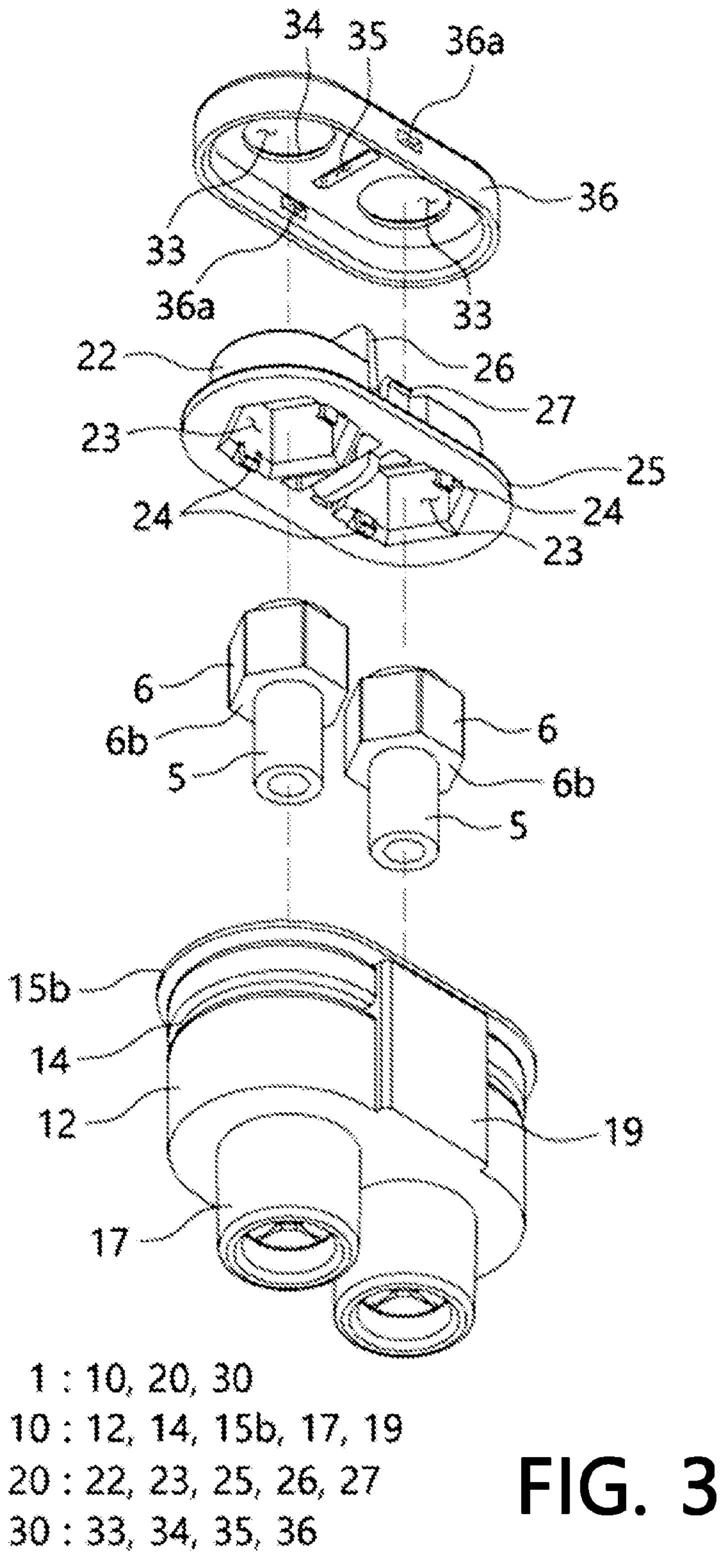

FIG. 1 is a perspective view illustrating a state in which a cable is coupled to a cable connector according to one embodiment of the present disclosure. FIGS. 2 and 3 are exploded perspective views illustrating a state in which the cable connector, a lug, a circuit board, and a coupling screw according to one embodiment of the present disclosure are dissembled from different angles. In this case, in order to describe the present disclosure, the circuit board and the coupling screw are not illustrated in FIG. 3.

Referring to FIGS. 1 to 3, a cable connector 1 according to one embodiment of the present disclosure may include a first member 10, a second member 20, and a third member 30, and a cable 4 and a lug 5 of the cable 4 may be coupled in the first to third members 10, 20, and 30.

First, the cable 4 to which the cable connector 1 according to one embodiment of the present disclosure may be applied will be described. Referring to FIG. 2, the lug 5 may be provided on one end portion of the cable 4 connected to a circuit board 3. In the present specification, the lug 5 is a cylindrical connecting member for connecting the cable 4 to the circuit board 3.

A protruding portion 6 having a diameter greater than a diameter of the lug 5 may be formed on an outer circumferential surface of the lug 5. In this case, in the present specification, a lower side portion of the lug 5 is a part of the lug 5 positioned under the protruding portion 6, and an upper side portion of the lug 5 is a part of the lug 5 positioned above the protruding portion 6.

A lower portion of the lug 5 may be coupled to the cable 4, and an upper portion of the lug 5 may be connected to the circuit board 3 so that the lug 5 may serve to connect the cable 4 and the circuit board 3. In this case, a screw hole 5*a* to which a coupling screw 8 is coupled may be formed in the upper side portion of the lug 5.

Hereinafter, first, a process in which the cable connector 1 according to one embodiment of the present disclosure connects the cable 4 to the circuit board 3 will be described.

Referring to FIG. 2, a part of the cable 4 may be accommodated in a first member body 12. The second member 20 may be coupled to an upper portion of the first member body 12, and the lug 5 of the cable 4 may be inserted into a coupling port 23 of the second member 20.

The third member 30 may be coupled to an upper portion of the second member 20 to cover an upper side of the second member 20. The upper side portion of the lug 5 may be exposed to the outside through a coupling hole 33 of a cover part 32 of the third member 30.

The circuit board 3 may be disposed on the third member 30, and a coupling hole 3*a* corresponding to the coupling hole 33 of the third member 30 may be formed in the circuit board 3. The coupling screw 8 may pass through the coupling hole 3*a* in a direction from an upper side to a lower side of the circuit board 3 and may be coupled to the screw hole 5*a* of the lug 5.

In a process in which the coupling screw 8 is coupled to the screw hole Sa of the lug 5, the coupling screw 8 may apply a predetermined downward force to the circuit board 3 and the lug 5.

Referring to FIGS. 2 and 3, the first member body 12 may have a predetermined length in a vertical direction and a thickness sufficient to accommodate a part of the cable 4.

A through-hole 13 through which the cable 4 passes may be formed in the first member body 12 in the vertical direction. In this case, a diameter of the through-hole 13 may be greater than or equal to a diameter of the cable 4.

In addition, the diameter of the through-hole 13 may be smaller than the diameter of the lug protruding portion 6. Accordingly, when the lug 5 and the cable 4 are inserted into the through-hole 13 in a direction from a lower side toward an upper side of the first member 10, and the lug protruding portion 6 exits the upper side of the first member 10, a lug protruding portion lower surface 6*b* may be seated on an upper surface of the first member 10, and a part of the cable 4 may be accommodated in the first member 10.

A second coupling groove 15*a* may be formed in an edge portion 15 of an upper surface of the first member 10. The second coupling groove 15*a* may be formed to be engraved with a predetermined depth in an outward direction of the first member body 12.

In addition, a second member guide 15*b* extending to a predetermined length in the outward direction of the first member body 12 may be formed on an upper portion of the second coupling groove 15*a*. The second member guide 15*b* may serve to guide the second member 20 to the upper side of the first member 10 so that the second member 20 is more easily coupled to an upper side portion of the first member 10.

A first coupling groove 14 having a predetermined depth in an inward direction of the first member body 12 may be formed in an outer circumferential surface of the first member body 12. In this case, the first coupling groove 14 may be formed in a circumferential direction of the first member body 12.

Referring to FIGS. 2 and 3, a second member body 22 may have a thickness sufficient to accommodate the lug 5 therein and a height equal to a height of the lug protruding portion 6.

The coupling port 23 corresponding to the through-hole 13 of the first member 10 may be formed in the second member body 22. In this case, the lug protruding portion 6 may be inserted into and coupled to the coupling port 23.

In this case, a shape of a cross section of the coupling port 23 may be formed to correspond to a shape of a cross section of the lug protruding portion 6. In the illustrated embodiment, the cross section of the coupling port 23 has a hexagonal shape corresponding to a hexagonal shape of the cross section of the lug protruding portion 6.

Accordingly, the lug 5 can be more stably coupled to and supported by the second member 20.

Particularly, when the cross section of the lug protruding portion 6 and the cross section of the coupling port 23 are formed in polygonal shapes, a corner of the lug protruding portion 6 may be hooked on an inner wall of the coupling port 23 to prevent the lug 5 from rotating around each of central axes C1 and C2.

Accordingly, an assembly error of the lug 5 and the circuit board 3 can be prevented, and the cable 4 can be stably connected at an exact position of the circuit board 3.

A second coupling protrusion 25 having a shape corresponding to the second coupling groove 15*a* of the first member 10 may be formed on a lower portion of the second member 20. The second coupling protrusion 25 may be insertion-coupled to the second coupling groove 15*a* to couple the second member 20 to the upper side portion of the first member 10.

A third coupling protrusion 27 may be formed on one side of the second member body 22. The third coupling protrusion 27 may have a hook shape protruding in an outward direction of the second member body 22.

A first lug fixing part 24 formed to protrude in an inward direction of the coupling port 23 may be formed on an entrance of the coupling port 23 positioned adjacent to the first member 10. First lug fixing parts 24 may be symmetrically formed on a front side and a rear side of the entrance of the coupling port 23.

Meanwhile, the first lug fixing part 24 may be formed to protrude downward from a lower surface of the second member 20.

In this case, the first lug fixing part 24 may be interfered with and damaged by an upper surface of the first member 10. Accordingly, the first lug fixing part 24 may not serve to support the lug protruding portion lower surface 6*b*.

In order to prevent this problem, a seating groove 13*a* may be formed in the through-hole 13 of the first member 10 at a position corresponding to the first lug fixing part 24 to prevent the first lug fixing part 24 from being interfered with by the first member 10.

In other words, the seating groove 13*a* having a predetermined depth in an outward direction of each of the central axes C1 and C2 may be formed in an upper side portion of the through-hole 13 of the first member. In this case, the seating groove 13*a* may be open in an upward direction of the first member body 12.

Referring to FIGS. 2 and 3, the third member 30 may include the cover part 32 which covers the upper side of the second member 20 and a sidewall part 36 formed along an edge of the cover part. A third coupling groove 36*a* coupled to the third coupling protrusion 27 of the second member 20 may be formed in the sidewall part 36 of the third member 30.

The coupling hole 33 corresponding to the coupling port 23 of the second member 20 may be formed in the cover part 32 of the third member 30. The coupling hole 33 is to be coupled to the upper side portion of the lug 5. In this case, a second lug fixing part 34 protruding in an inward direction of the coupling hole 33 may be formed in the coupling hole 33.

Meanwhile, referring to FIGS. 2 and 3, in the cable connector 1 according to one embodiment of the present disclosure, the through-hole 13, the coupling port 23, and the coupling hole 33 may be coaxially arranged along each of the central axes C1 and C2. Accordingly, the cable 4 may be accommodated in the cable connector 1 without being bent.

In addition, the cable 4 and the lug 5 may be provided as a plurality of cables 4 and a plurality of lugs 5. In this case, the through-hole 13, the coupling port 23, and the coupling hole 33 may be provided as a plurality of through-holes 13, a plurality of coupling ports 23, and a plurality of coupling holes 33 corresponding to the plurality of cables 4, and a guide protrusion 26 protruding to a predetermined height in a longitudinal direction of the cable 4 may be formed between the plurality of coupling ports 2.

A guide groove 35 coupled to the guide protrusion 26 may be formed in the cover part 32 of the third member 30. Accordingly, when the cable 4 is a current cable, the guide protrusion 26 can secure an insulation distance between a positive pole and a negative pole of the circuit board.

Figure 4:
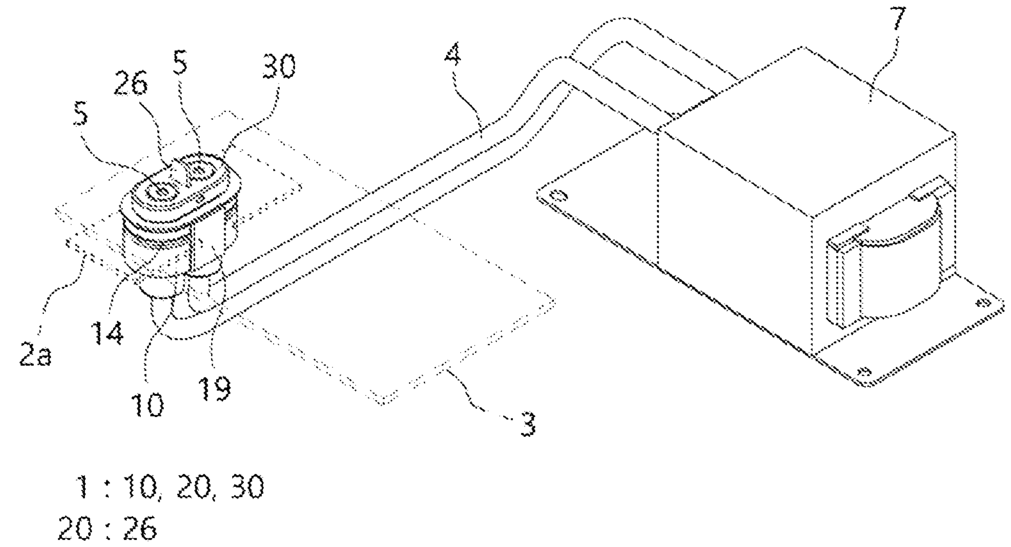
FIG. 4 is a perspective view illustrating a state in which the cable connector according to one embodiment of the present disclosure is fixed to a case so that the circuit board is connected to the cable. In this case, in order to describe the present disclosure, the circuit board and a first fixing protrusion of the case are illustrated using dotted lines, all components viewed through the circuit board and the first fixing protrusion are illustrated using solid lines, and the case is not illustrated.

FIG. 4 is a perspective view illustrating a state in which the cable connector according to one embodiment of the present disclosure is fixed to a case so that the circuit board is connected to the cable. In this case, in order to describe the present disclosure, the circuit board and a first fixing protrusion of the case are illustrated using dotted lines, all components viewed through the circuit board and the first fixing protrusion are illustrated using solid lines, and the case is not illustrated.

Referring to FIG. 4, the first member 10 of the cable connector 1 according to one embodiment of the present disclosure may be fixed to the case (not shown) for accommodating the circuit board 3 therein. In this case, a first fixing protrusion 2*a* which may be insertion-coupled to the first coupling groove 14 of the first member 10 may be formed on an outer surface of the case.

Accordingly, since the cable connector 1 according to one embodiment of the present disclosure may be fixedly coupled to the case, the cable 4 and the lug 5 coupled to and accommodated in the cable connector 1 can be fixedly supported in the case by the cable connector 1.

Hereinafter, the first and second lug fixing parts which support a lower surface and an upper surface of the lug protruding portion, respectively, will be described in more detail.

Figure 5:
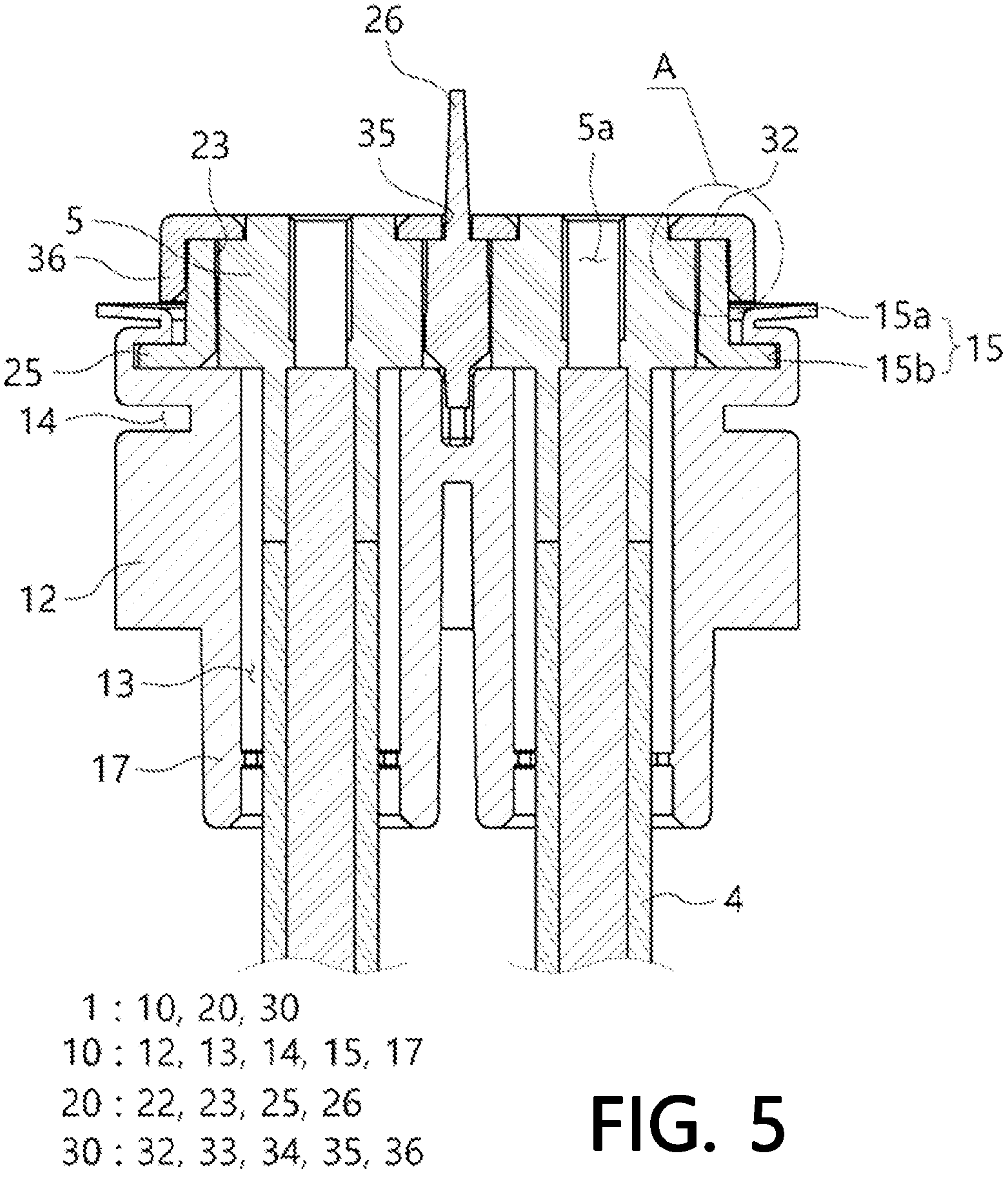
FIG. 5 is a cross-sectional view along line I-I' of FIG. 1.
Figure 6:
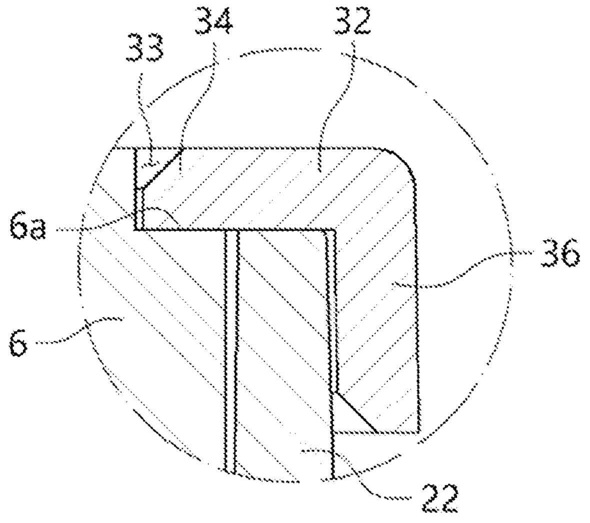
FIG. 6 is an enlarged view illustrating portion 'A' of FIG. 5.
Figure 7:
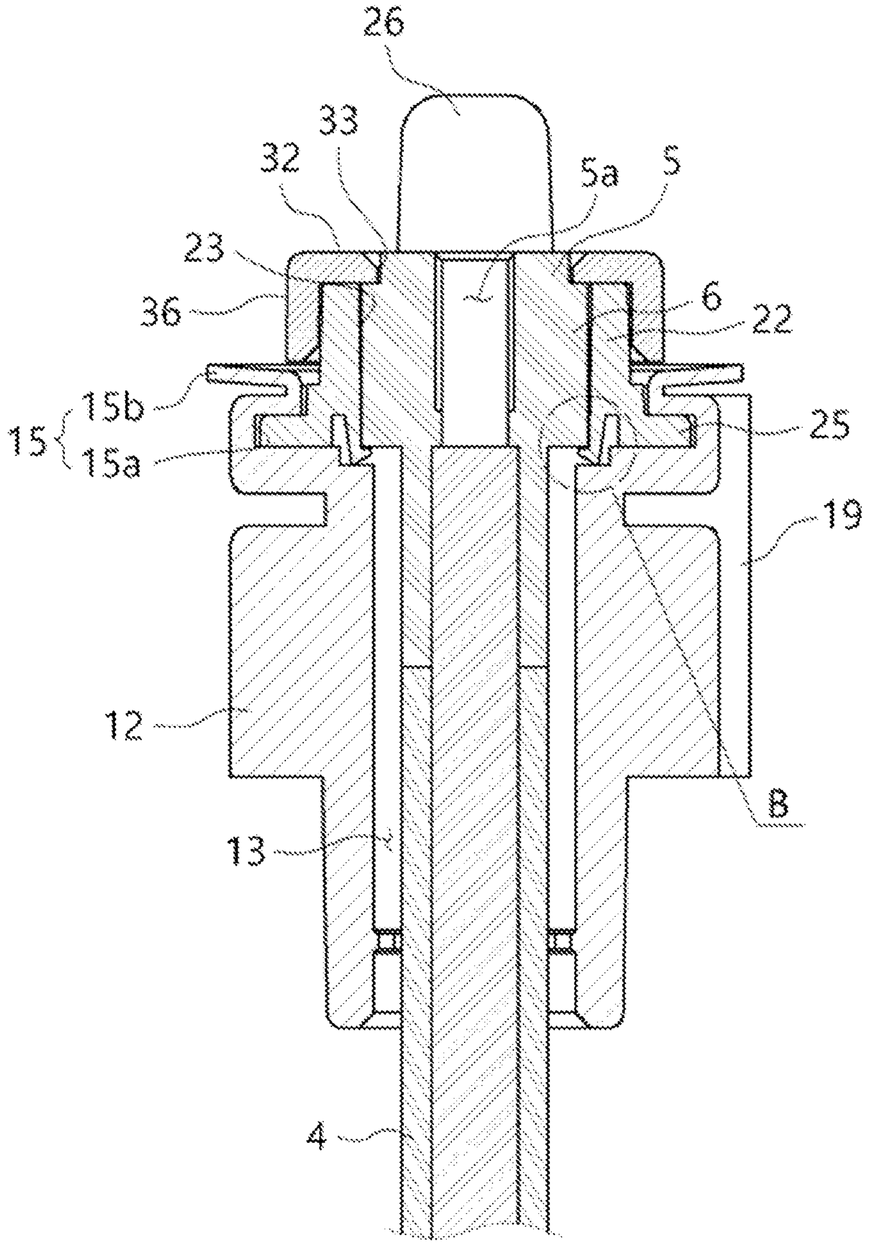
FIG. 7 is a cross-sectional view along line II-II' of FIG. 1.
Figure 8:
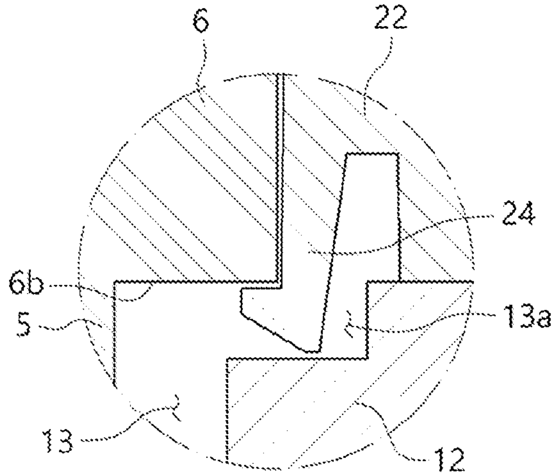
FIG. 8 is an enlarged view illustrating portion 'B' of FIG. 7.

FIG. 5 is a cross-sectional view along line I-I' of FIG. 1. FIG. 6 is an enlarged view illustrating portion 'A' of FIG. 5. FIG. 7 is a cross-sectional view along line II-II' of FIG. 1. FIG. 8 is an enlarged view illustrating portion 'B' of FIG. 7.

Referring to FIGS. 5 to 8, the first lug fixing part 24 protruding in the inward direction of the coupling port 23 may be formed at a side of an opening of the coupling port 23 positioned adjacent to the first member 1. The first lug fixing part 24 is for supporting the lug protruding portion lower surface 6*b* to prevent the lug 5 from moving downward.

More specifically, the first lug fixing part 24 may extend to a predetermined length in a downward direction and may have a hook shape bent in the inward direction of the coupling port 23. In this case, an end portion of the first lug fixing part 24 may be slightly inclined upward. The first lug fixing part 24 may have elasticity.

Accordingly, the lug protruding portion 6 may be inserted into the coupling port 23 from under the second member 20 and may extend over the hook shape of the first lug fixing part 24 which is inclined upward.

When the lug protruding portion 6 passes through the through-hole 13 of the first member 10 so that the lug protruding portion lower surface 6*b* is in contact with an upper surface of the first member 10, the first lug fixing part 24 may be elastically restored to its original shape. Accordingly, the upwardly inclined hook-shaped end portion of the first lug fixing part 24 may support the lug protruding portion lower surface 6*b*.

Accordingly, in a process in which the coupling screw 8 is coupled to the lug 5, even when a force is applied to the lug 5 in a downward direction, since the lower surface of the lug protruding portion 6 is supported by the first lug fixing part 24, the lug 5 can be fixed without being moved downward. Accordingly, the cable 4 may be stably connected at an exact position of the circuit board 3 in an electronic device.

Referring to FIGS. 5 to 8, the second lug fixing part 34 protruding in the inward direction of the coupling hole 33 may be formed in the coupling hole 33 of the third member 30. Accordingly, a lug protruding portion upper surface 6*a* may be hooked on the second lug fixing part 34, and thus the lug 5 may not move upward.

Referring to FIGS. 5 to 8, in the cable connector 1 according to one embodiment of the present disclosure, the second lug fixing part 34 may be formed by changing a diameter of the coupling hole 33.

In the present embodiment, the diameter of the coupling hole 33 is greater than or equal to a diameter of the upper side portion of the lug 5 and smaller than the diameter of the lug protruding portion 6. Accordingly, the upper side portion of the lug 5 is coupled to the coupling hole 33, the lug protruding portion upper surface 6*a* is in contact with a lower surface of the cover part 32 of the third member 30, and the lug 5 is restricted from moving in an upward direction of the cover part 32 of the third member 30.

That is, in the cable connector 1 according to one embodiment of the present disclosure, the lug 5 is fixed such that vertical movement of the lug 5 is restricted by the first lug fixing part 24 and the second lug fixing part 34. In addition, the second and third members 20 and 30 including the first and second lug fixing parts 24 and 34 are coupled to the first member 10, and the first member 10 to which the second and third members 20 and 30 are coupled is fixed to the case.

Accordingly, in a process in which the coupling screw 8 is coupled to the screw hole 5*a* of the lug 5, when a force is applied to the lug 5 and the cable 4 in a downward direction, the lug 5 may be fixedly supported by the first to third members 10, 20, and 30 fixed by the case.

Accordingly, according to the cable connector 1, the cable 4 can be stably fixed in the electronic device, and the cable 4 can be stably coupled at an exact position of the circuit board 3 in the electronic device.

Meanwhile, referring to FIGS. 2 and 3 again, a reinforcement part 19 protruding to a predetermined height in an outward direction of the cable 4 may be formed on an outer circumferential surface of the first member 10.

The reinforcement part 19 is for resisting against a turning force about each of the central axes C1 and C2 applied when the coupling screw 8 is coupled to the screw hole 5*a* of the lug 5 to prevent the first member 10 from being deformed and damaged.

In addition, the reinforcement part 19 may be formed on only one side surface on the outer circumferential surface of the first member 10 to indicate a direction in which the first member 10 is coupled to the case. Accordingly, a user may check a direction in which the outer circumferential surface, on which the reinforcement part 19 is formed, faces and fix the first member 10 to the case so that a surface opposite to the outer circumferential surface on which the reinforcement part 19 is formed faces the case.

In this case, the first member 10 may be formed of an elastic material. For example, the first member 10 may be formed of a rubber material. Accordingly, even when the through-hole 13 of the first member 10 has the diameter smaller than the diameter of the lug protruding portion 6, the lug 5 may pass through the elastically deformed through-hole 13.

In addition, any one of or both the second member 20 and the third member 30 may be formed of a rigid plastic material that does not easily transfer electricity or heat. For example, the second member 20 and/or the third member 30 may be formed of a polycarbonate (PC) or PC acrylonitrile, butadiene, and styrene (ABS) material.

Figure 9:
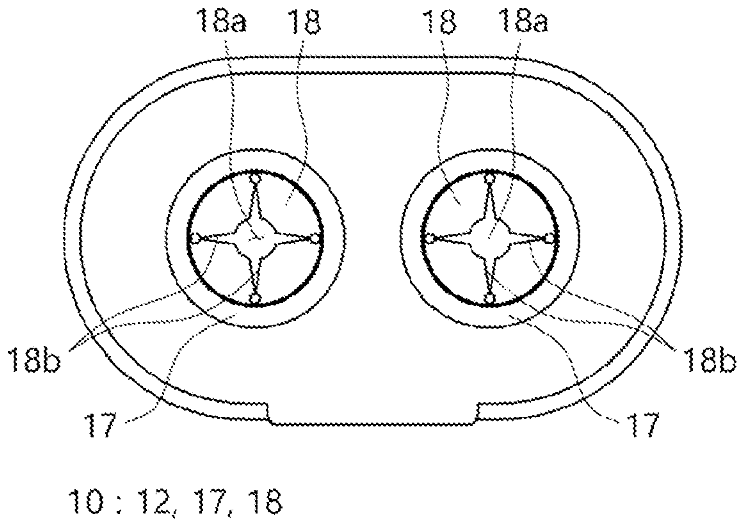
FIG. 9 is a bottom view illustrating a third member of the cable connector according to one embodiment of the present disclosure.

FIG. 9 is a bottom view illustrating the third member of the cable connector according to one embodiment of the present disclosure.

Referring to FIGS. 5 to 8 again, a cable guide 17 communicating with the through-hole 13 may be formed in a lower portion of the first member 10 to guide the cable 4 into the through-hole 13.

The cable guide 17 may extend to a predetermined length in a downward direction from a lower surface of the first member 10 and have a hollow shape so that the cable 4 passes through the inside of the cable guide 17.

Meanwhile, a sealing part may be provided in the cable guide 17. The sealing part may seal a space which may be formed between the cable 4 and an inner circumferential surface of the hollow cable guide 17 to prevent dust or moisture from penetrating the inside of the first member 10 (or the inside of the through-hole 13).

Referring to FIG. 9, in the cable connector 1 according to one embodiment of the present disclosure, the sealing part 18 may be an elastic membrane perpendicularly installed on an inner circumferential surface of the hollow cable guide 17.

A central hole 18*a* having a diameter slightly smaller than the diameter of the cable 4 may be formed in a center of the sealing part 18. In this case, the sealing part 18 may be formed of a plurality of membranes divided by gaps 18*b* formed from the central hole 18*a* of the sealing part 18 in an inner circumferential direction of the cable guide 17. In the illustrated embodiment, the sealing part 18 is formed of four divided membranes.

When the cable 4 passes through the hollow cable guide 17, an end portion of the sealing part 18 may be bent upward along with the cable 4 and be in close contact with an outer circumferential surface of the cable 4. Accordingly, the sealing part 18 may block the space formed between the cable 4 and the inner circumferential surface of the hollow cable guide 17.

Accordingly, the cable connector 1 according to one embodiment of the present disclosure can be applied to various cables 4 regardless of levels of dustproofness and waterproofness required according to the cable 4.

For example, the cable connector 1 according to one embodiment of the present disclosure may be commonly applied to the cable 4 corresponding to ingress protection (IP) codes of IP 20 and IP 50. In this case, the IP code refers to a protection level of an outer skin (enclosure) of an electronic product provided in relation to penetration elements (a part of a body such as a hand or a finger), dust, sudden contact, moisture, and the like.

Meanwhile, since the end portion of the sealing part 18 may be more easily bent upward as the number of the gaps 18*b* by which the plurality of divided membranes are formed to constitute the sealing part 18 is larger, the cable 4 can be more easily inserted into the through-hole 13.

However, as the number of the gaps 18*b* is larger, since the space formed between the cable 4 and the inner circumferential surface of the hollow cable guide 17 cannot be completely blocked, the number of the gaps 18*b* may be properly adjusted.

As described above, in the cable connector according to one embodiment of the present disclosure, since the first member is fixed to the case, when the circuit board and the cable are connected, a force applied to the lug can be supported, and the cable can be stably fixed in the case.

In addition, since the first lug fixing part protruding in the inward direction of the coupling port and the second lug fixing part protruding in the inward direction of the coupling hole support a lower side of the lug, the cable can be stably connected at an exact position of the circuit board.

In addition, since the cable guide includes the sealing part which blocks dust and moisture from penetrating the inside of the first member, the cable connector can be applied to various cables regardless of levels of dustproofness and waterproofness required according to the cable.

While some embodiments of the present disclosure have been described above, the spirit of the present disclosure is not limited to the embodiments proposed in this specification, and other embodiments may be easily suggested by adding, changing, and removing components within the scope of the disclosure by those skilled in the art and will fall within the spiritual range of the present disclosure.

The invention claimed is:

1. A cable connector which connects a lug formed on one end of a cable and including a protruding portion having a diameter greater than a diameter of the cable to a circuit board installed in a case, the cable connector comprising:

- a first member which is fixed to the case and in which a through-hole into which the cable is inserted; and
- a second member which is installed on one side of the first member and in which a coupling port to which the protruding portion of the lug is coupled is formed,
- wherein the second member includes a first lug fixing part formed to protrude in an inward direction of the coupling port on an entrance of the coupling port adjacent to the first member, and
- wherein an end portion of the first lug fixing part is formed in a hook shape and is configured to be elastically operated such that the first lug fixing part elastically moves in an outward direction of the coupling port while the lug is being coupled, and elastically moves back in the inward direction to support a lower portion of the lug after the coupling is completed.

2. The cable connector of claim 1, further comprising a third member installed on one side of the second member,

- wherein a coupling hole to which an end portion of the lug is coupled is formed in the third member, and
- a second lug fixing part protruding in an inward direction of the coupling hole is formed in the coupling hole.

3. The cable connector of claim 1, wherein a shape of a cross section of the coupling port corresponds to a shape of a cross section of the protruding portion of the lug.

4. The cable connector of claim 2, wherein the through-hole, the coupling port, and the coupling hole are coaxially arranged.

5. The cable connector of claim 1, wherein:

- a coupling groove is formed in an outer circumferential surface of the first member; and
- a fixing protrusion insertion-coupled to the fixing groove is formed on the case.

6. The cable connector of claim 1, wherein a reinforcement part protruding in an outward direction of the cable is formed on an outer circumferential surface of the first member.

7. The cable connector of claim 1, wherein:

the first member is formed of an elastic material; and the second member is formed of a rigid plastic material.

8. The cable connector of claim 1, wherein:

a cable guide communicating with the through-hole is formed in the first member to guide the cable into the through-hole; and a sealing part formed to prevent dust or moisture from penetrating an inside of the through-hole is provided on the cable guide.

9. The cable connector of claim 2, wherein:

the cable is provided as a plurality of cables;

the through-hole, the coupling port, and the coupling hole are provided as a plurality of through-holes, a plurality of coupling ports, and a plurality of coupling holes to individually correspond to the plurality of cables;

a guide protrusion formed to protrude to a predetermined height in a longitudinal direction of the cable is formed between the plurality of coupling ports; and a guide groove to which the guide protrusion is coupled is formed in the third member.

10. A cable connector which connects a lug formed on one end of a cable and including a protruding portion having a diameter greater than a diameter of the cable to a circuit board installed in a case, the cable connector comprising:

a first member which is fixed to the case and in which a through-hole into which the cable is inserted is formed; and a second member which is installed on one side of the first member and in which a coupling port to which the protruding portion of the lug is coupled is formed;

a third member installed on one side of the second member, wherein the second member includes a first lug fixing part formed to protrude in an inward direction of the coupling port on an entrance of the coupling port adjacent to the first member, wherein a coupling hole to which an end portion of the lug is coupled is formed in the third member, and wherein a second lug fixing part protruding in an inward direction of the coupling hole is formed in the coupling hole.

* * * * *